(12) United States Patent
Harrison et al.

(10) Patent No.: US 9,633,014 B2
(45) Date of Patent: Apr. 25, 2017

(54) POLICY BASED VIDEO CONTENT SYNDICATION

(75) Inventors: Kyle Harrison, San Francisco, CA (US); David King, San Francisco, CA (US)

(73) Assignee: Google Inc., Mountain View, CA (US)

( * ) Notice: Subject to any disclaimer, the term of this patent is extended or adjusted under 35 U.S.C. 154(b) by 932 days.

(21) Appl. No.: 12/686,764

(22) Filed: Jan. 13, 2010

(65) Prior Publication Data

US 2010/0263020 A1     Oct. 14, 2010

Related U.S. Application Data

(60) Provisional application No. 61/167,838, filed on Apr. 8, 2009.

(51) Int. Cl.
   *G06F 17/30*    (2006.01)
   *G06Q 30/02*    (2012.01)
   *H04L 29/08*    (2006.01)

(52) U.S. Cl.
   CPC ....... *G06F 17/30017* (2013.01); *G06Q 30/02* (2013.01); *H04L 67/02* (2013.01); *H04L 67/20* (2013.01)

(58) Field of Classification Search
   CPC ..... G06F 21/10; G06F 17/30017; H04L 67/20
   USPC ............. 726/1, 2, 4, 21, 26, 30, 31; 380/201
   See application file for complete search history.

(56) References Cited

U.S. PATENT DOCUMENTS

| | | |
|---|---|---|
| 5,634,012 A | 5/1997 | Stefik et al. |
| 5,664,018 A | 9/1997 | Leighton |
| 5,892,536 A | 4/1999 | Logan et al. |
| 5,918,223 A | 6/1999 | Blum et al. |
| 6,091,822 A | 7/2000 | Mellows et al. |
| 6,407,680 B1 | 6/2002 | Lai et al. |
| 6,693,236 B1 | 2/2004 | Gould et al. |
| 6,810,388 B1 | 10/2004 | Sato |
| 6,871,200 B2 | 3/2005 | MacQueen et al. |
| 6,889,383 B1 | 5/2005 | Jarman |
| 6,898,799 B1 | 5/2005 | Jarman |
| 6,976,165 B1 | 12/2005 | Carpentier et al. |
| 6,983,371 B1 | 1/2006 | Hurtado et al. |
| 7,020,635 B2 | 3/2006 | Hamilton et al. |

(Continued)

FOREIGN PATENT DOCUMENTS

| | | |
|---|---|---|
| EP | 2031594 A2 | 3/2009 |
| GB | 2369203 A | 5/2002 |

(Continued)

OTHER PUBLICATIONS

PCT International Search Report and Written Opinion, PCT/US2010/028237, May 12, 2010, 12 pages.

(Continued)

*Primary Examiner* — Tamara T Kyle

(74) *Attorney, Agent, or Firm* — Fenwick & West LLP

(57) ABSTRACT

An item of hosted content is received from a media host. A match metric representing an aspect of a match between the item of hosted content and an item of reference content, the item of reference content provided by a content owner having rights to the item of reference content. A policy associated with the item of reference content is identified responsive to the value to that represents the correspondence, the policy including terms of use for the hosted content. The policy is provided to the media host.

32 Claims, 7 Drawing Sheets

(56) References Cited

U.S. PATENT DOCUMENTS

| | | |
|---|---|---|
| 7,043,473 B1 | 5/2006 | Rassool et al. |
| 7,366,787 B2 | 4/2008 | Salas et al. |
| 7,369,677 B2 | 5/2008 | Petrovic et al. |
| 7,370,017 B1 | 5/2008 | Lindeman et al. |
| 7,653,552 B2 | 1/2010 | Vaidyanathan et al. |
| 2001/0010756 A1 | 8/2001 | Ogino |
| 2002/0038296 A1 | 3/2002 | Margolus et al. |
| 2002/0082731 A1 | 6/2002 | Pitman et al. |
| 2002/0082999 A1 | 6/2002 | Lee et al. |
| 2002/0087885 A1 | 7/2002 | Peled et al. |
| 2002/0112171 A1 | 8/2002 | Ginter et al. |
| 2002/0165819 A1 | 11/2002 | McKnight et al. |
| 2002/0178271 A1 | 11/2002 | Graham et al. |
| 2003/0037010 A1 | 2/2003 | Schmelzer |
| 2003/0061490 A1 | 3/2003 | Abajian |
| 2004/0010602 A1 | 1/2004 | Van Vleck et al. |
| 2004/0163106 A1 | 8/2004 | Schrempp et al. |
| 2004/0221118 A1 | 11/2004 | Slater et al. |
| 2004/0255147 A1 | 12/2004 | Peled et al. |
| 2005/0080846 A1 | 4/2005 | McCleskey et al. |
| 2005/0154680 A1 | 7/2005 | Schmelzer |
| 2005/0246752 A1 | 11/2005 | Liwerant et al. |
| 2006/0031870 A1 | 2/2006 | Jarman et al. |
| 2006/0085816 A1 | 4/2006 | Funk et al. |
| 2006/0095792 A1 | 5/2006 | Hurtado et al. |
| 2006/0106725 A1 | 5/2006 | Finley et al. |
| 2006/0106867 A1 | 5/2006 | Burges et al. |
| 2006/0110137 A1 | 5/2006 | Tsuda et al. |
| 2006/0167881 A1 | 7/2006 | Aydar et al. |
| 2006/0177198 A1 | 8/2006 | Jarman et al. |
| 2006/0206486 A1 | 9/2006 | Strickland |
| 2006/0212927 A1 | 9/2006 | Riku et al. |
| 2007/0028308 A1 | 2/2007 | Nishio et al. |
| 2007/0058925 A1 | 3/2007 | Chiu |
| 2007/0101360 A1 | 5/2007 | Gutta et al. |
| 2007/0118910 A1 | 5/2007 | Taylor |
| 2007/0180537 A1 | 8/2007 | He et al. |
| 2007/0198492 A1 | 8/2007 | Quoc et al. |
| 2007/0203911 A1 | 8/2007 | Chiu |
| 2007/0211174 A1 | 9/2007 | Putterman et al. |
| 2007/0282472 A1 | 12/2007 | Seldman |
| 2008/0052783 A1 | 2/2008 | Levy |
| 2008/0059426 A1 | 3/2008 | Brock et al. |
| 2008/0059461 A1 | 3/2008 | Brock et al. |
| 2008/0059536 A1 | 3/2008 | Brock et al. |
| 2008/0109306 A1* | 5/2008 | Maigret et al. ............... 705/14 |
| 2008/0109369 A1 | 5/2008 | Su et al. |
| 2009/0052784 A1 | 2/2009 | Covell et al. |
| 2009/0083228 A1* | 3/2009 | Shatz et al. ............... 707/3 |
| 2009/0144325 A1 | 6/2009 | Chastagnol et al. |
| 2013/0014209 A1 | 1/2013 | Chastagnol et al. |

FOREIGN PATENT DOCUMENTS

| | | |
|---|---|---|
| GB | 2397904 A | 8/2004 |
| WO | WO-02/11033 A1 | 2/2002 |
| WO | WO 02/082271 A1 | 10/2002 |
| WO | WO-02/103968 A1 | 12/2002 |
| WO | WO 03/046761 A2 | 6/2003 |
| WO | WO-2005/060424 A2 | 7/2005 |
| WO | WO-2006/007449 A2 | 1/2006 |
| WO | WO-2006/077551 A2 | 7/2006 |
| WO | WO 2009/017875 A2 | 2/2009 |

OTHER PUBLICATIONS

PCT International Search Report and Written Opinion, PCT/IB2008/000997, Aug. 3, 2009, 6 Pages.

PCT International Search Report and Written Opinion, PCT/US2007/083677, May 14, 2008, 7 pages.

Combined Search and Examination Report, UK Patent Application No. GB0805603.8, Jul. 17, 2008, 4 pages.

U.S. Patent Application for U.S. Appl. No. 12/113,678, filed May 1, 2008, 24 Pages.

U.S. Patent Application for U.S. Appl. No. 12/113,034, filed Apr. 30, 2008, 23 Pages.

Provisional Patent Application for U.S. Appl. No. 60/281,881, filed Apr. 5, 2001, 94 Pages.

"Publisher." The Penguin English Dictionary. London: Penguin, 2007. Credo Reference. Web. Jul. 31, 2010. <http://www.xreferplus.com/entry/penguineng/publisher>.

PCT International Preliminary Report on Patentability, PCT/US2010/028237, Oct. 24, 2011, 20 Pages.

3rd Office Action for Chinese Patent Application No. CN 201080025591.8, Oct. 23, 2014, 6 Pages.

2nd Office Action for Chinese Patent Application No. CN 201080025591.8, Jun. 10, 2014, 30 Pages.

Office Action for Canadian Patent Application No. 2,757,957, May 20, 2014, 3 Pages.

Office Action for Japanese Patent Application No. P2012-504694, May 14, 2013, 4 Pages.

Supplementary European Search Report for European Patent Application No. 10762093, Sep. 4, 2013, 5 Pages.

Office Action for Canadian Patent Application No. 2,757,957, Aug. 19, 2013, 8 Pages.

First Office Action for Chinese Patent Application No. CN 201080025591.8, Jan. 10, 2014, 36 Pages.

* cited by examiner

YouTube Content and Licensing Manager   Indira for Indie Films    My settings   Help   Sign out

Web-wide syndication settings

☐ Only YouTube is authorized to license my content.
YouTube will still respect all individual blocks and country settings that you specify for each video. Any participating site that requests permission to display your content will receive a "not allowed" response. You will receive a report of other sites that request your content.

☑ Allow YouTube premium partners to license my content.
These sites must respect the licensing policies that you set for each video. Premium partners are certified to have monetization and tracking platforms built in. View the list of premium partners...

☐ Allow all partner sites to license my content.
Any site that is approved for YouTube's web-wide syndication program may license your content according to your policies. You can always disallow specific sites or categories of sites from using your content.

Sites allowed to license my content

| ☐ Site name | Default policy | [Search] | Videos licensed |
|---|---|---|---|
| ☐ YouTube (youtube.com) ★ | Monetize | 15,223 | 3,456 |
| ☐ Google Videos (videos.google.com) ★ | Track | 88,789 | 3,000 |
| ☐ Yahoo! Videos (videos.yahoo.com) ★ | Monetize | 13,456 | 1,678 |
| ☐ AOL Videos (videos.aol.com) ★ | Monetize | 13,456 | 1,678 |

About this partner: AOL Video has millions of free, high quality videos including music videos, news clips, movie trailers, viral videos and full-length TV shows.
International sites: 44 international domains
Licensing options: Revenue Sharing
Tracking (views, impressions, ad revenue)
Status: This site is a premium partner Views from AOL Videos
[graph: 50Kb, Apr May June]

| ☐ Qwerty Videos (qvid.com) Not currently a partner | Monetize | 0 | 0 |

Add another site by URL: [        ]
Default policy for videos licensed by this site: [Monetize]
[Add this site]

^ Videos licensed refers to the number of your videos that each site is displaying

Sites banned from using my content

| ☐ See name | | [Search] | Requests from this site |
|---|---|---|---|
| ☐ Pornographic Generica | | | 3,456 |

[Delete]

You can decide how – or whether—different sites on the internet display your content.

YouTube partners with other websites. These sites check all videos and music against YouTube's Content Manager database to ensure that they have the rights to display that content on their site.

Learn more about YouTube's web wide syndication program

POLICY BASED VIDEO CONTENT SYNDICATION

CROSS-REFERENCE TO RELATED APPLICATIONS

This application claims the benefit of U.S. Provisional Application No. 61/167,838, filed on Apr. 8, 2009, which is incorporated by reference herein in its entirety.

FIELD

The present invention is generally related to identification and monetization of content. In particular, the present invention is directed to a media syndication engine that identifies and monetizes digital content that matches copyrighted content.

DESCRIPTION OF THE RELATED ART

The proliferation of media hosting web sites that allow users to upload multimedia content (e.g., music content and video content) for mass viewing has brought with it a number of challenges, not the least of which has been how to detect and handle uploaded content in which other entities have rights.

A single work may have multiple rights holders and various entities may hold other rights with regard to the content. For example, the author, the publisher, and the music label are just some of the many different entities that may have different rights in different countries. Videos have an additional layer of complexity, including, for example, rights associated with any music played along with the video.

While Performing Rights Organizations (PROs) such as The American Society of Composers, Authors and Publishers (ASCAP) exist to collect public performance royalties on behalf of the various copyright holders when their works are broadcast on the radio or on television, this type of collection mechanism is not available in the online environment.

Before appropriate payment can be made to rights holders, content must be correctly identified. Given the nature of user-generated content (UGC), that is, content provided by users to a media hosting web site, detecting content on a media hosting web site that is subject to the rights of others has proven to be very difficult.

Further, once content hosted on a media hosting site is identified, processes must exist to facilitate the rights holder's ability to control how their content is provided to viewers by the media hosting sites. Existing solutions further fail to provide rights holders the ability to control important aspects of monetization of their content at media hosting websites.

Accordingly, the rights holder must be given the ability to control how their content is monetized, for example, through advertising. Conversely, the media host must also be given the ability to identify right's holders associated with content on their site and entire into agreements with the content owners which allow the media host to provide copyrighted content to viewers.

SUMMARY OF THE INVENTION

The present invention enables rights holders of digital content, herein referred to as "content owners," to provide digital content to a media syndication server, herein referred to as the "VID server." Digital content provided by content rights holders to the VID server, is herein referred to as "reference content." The VID server is adapted to receive reference content provided by content owners in a number of different formats. The VID server is further adapted to receive metadata associated with the reference content.

The content owner also specifies policies for the reference content using interfaces provided by the VID server. A media host is an entity who provides media content to viewers. Typically, the media host provides media content provided by other entities such as user generated content (UGC). The policies specify which media hosts (e.g. a set of websites run by media hosts) may host and/or provide items of digital content to users which match the reference content to viewers. The policies specify how the reference content may be used on sites when a match is found between digital content hosted by a media host and the reference content. The policies may further specify financial information such as information for advertisement revenue sharing between the media host and the content owners.

The media hosts also provide items of digital content to the VID server. Digital content provided by the media hosts to the VID server is herein referred to as "hosted content." The VID server is adapted to receive hosted content in a number of different formats. The VID server is further adapted to receive metadata associated with the hosted content. The media hosts may also provide information indicating their default preferences for policy agreements.

Reference content received from the content owners and hosted content received from the media hosts is transcoded into a common file type once it has been uploaded. A fingerprinting module generates fingerprints for both the reference content and hosted content. Fingerprints for the items of hosted content and the items of reference content can then be compared to determine whether a match exists between an item of hosted content and an item of reference content. The term match, as used herein, can refer to a full match between the fingerprints for the items or a partial match between any sub-portion of the fingerprints. Match metrics are generated based on the match, where the match metrics quantify different aspects or degrees of the match. The match metrics include a duration metric which specifies a quantity of space and/or time over which the item of hosted content matches the item of reference content. The match metrics further include a proportion metric which specifies a value indicating the duration of the match relative to the total quantity of space and/or time of the item of hosted content. The match metrics further include a confidence metric which specifies a likelihood of the match between the item of reference content and item of hosted content. The match metrics further include an offset metric which specifies a time period corresponding to an offset between the reference content and the hosted content. According to the media type of the media content, different fingerprints may be generated for different channels associated with the content (e.g. audio channels, video channels or both) and used to generated match metrics specific to the channel.

The specified policies for the reference content are retrieved by the VID server. If one or more of the match metrics indicates a match between the hosted content and the reference content, the policy for the item of reference content is provided to the media host associated with the hosted content. According to an embodiment, the policy provided may require the media host's agreement to: provide activity information about the hosted content, prevent the hosted content from being distributed, provide the hosted content to viewers under restrictions specified by the policy and/or share revenue generated from providing the hosted content to content viewers.

Advertisers may bid to display advertisements in association with the reference content. Using interfaces provided by the VID server, advertisers can also view match metrics indicating the number of media hosts providing hosted content matching reference content. Advertisers can further view activity information concerning the reference content including the frequency at which hosted content matching the reference content is viewed by content viewers, for example, at a website associated with a media host. Based on this information, advertisers may bid on the an advertisement (i.e. agree to provide funds in exchange for displaying advertisements in association with hosted content matching reference content). Advertisers may then submit advertising information such as digital content which contains advertisements, herein referred to as "ad content," to the VID server.

Content owners can access the VID server via the communications network and view activity information and advertising information concerning their reference content. Content owners can also edit policy information for different media hosting websites. In one embodiment, different policies may be associated with a single media hosting website and a single item of reference content, depending on the geographic location of the computer downloading that content from the media hosting website. Similarly, different policies can be associated with a single media hosting website and a single item of content, depending on the identity of the content viewer or the viewing or uploading platform.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 4 illustrates a user interface for specifying policy information in accordance with an embodiment of the present invention.

FIG. 5 illustrates a user interface for viewing activity information in accordance with an embodiment of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1A:
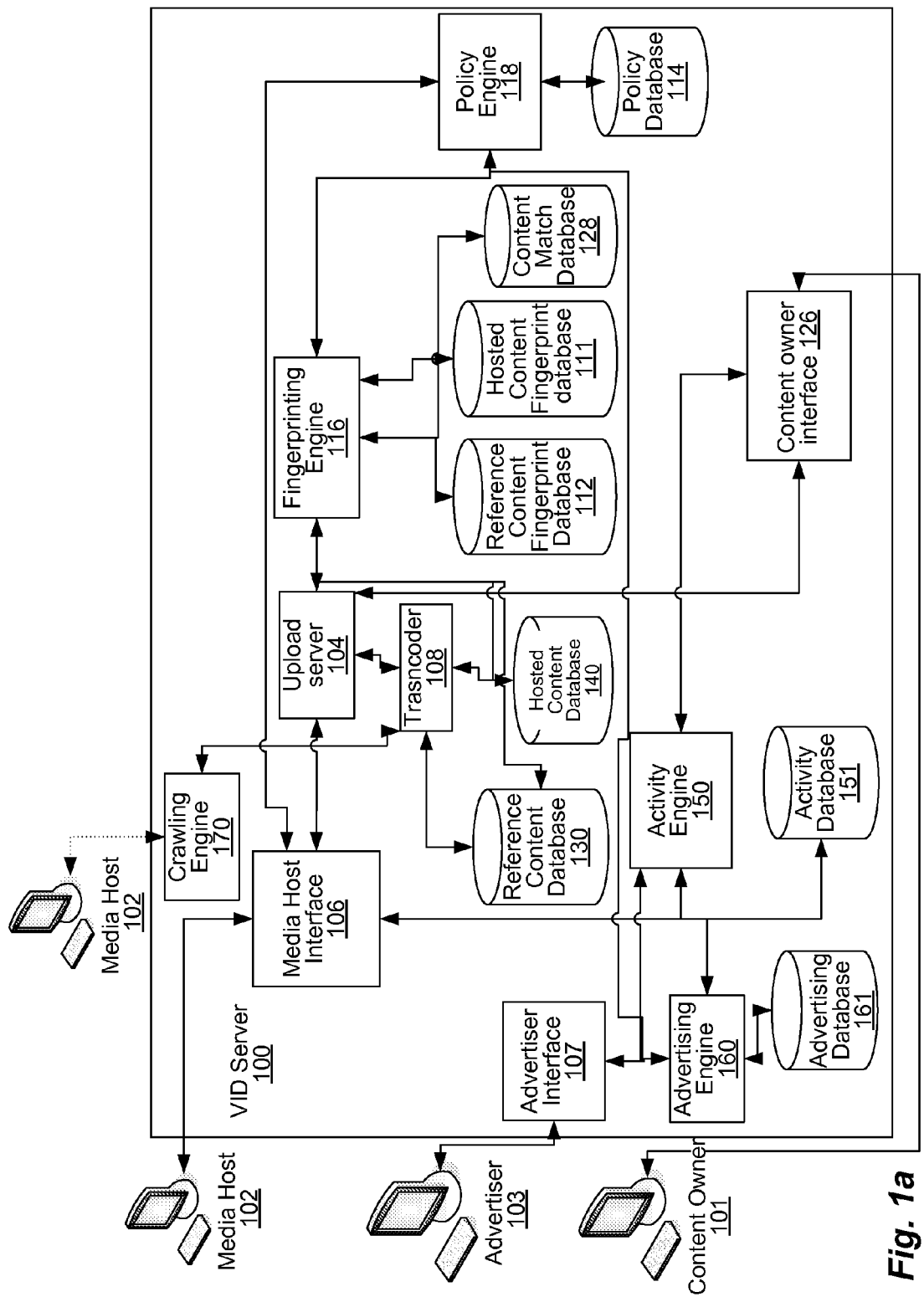
FIG. 1a is an illustration of the VID Server in accordance with an embodiment of the present invention.

FIG. 1 illustrates a system for providing rights management in accordance with an embodiment of the present invention. The VID server 100 includes a content upload server 104, an reference content database 130, a hosted content database 140, a transcoder 108, a fingerprinting engine 116, a reference content fingerprint database 112, a hosted content fingerprint database 111, a content match database 128, a policy engine 118, a policy database 114, a content owner interface 126, a media host interface 106, an advertiser interface 107, a crawling engine 170, an activity engine 150, an activity database 151, an advertising engine 160 and an advertising database 161. FIG. 1 also includes a media host system 102, a content owner system 101 and an advertiser system 103. Each of these is described further below.

The upload server 104 is configured to received uploaded content from the media host interface 106 and the content owner interface 126, and is one example of a means for doing so. Although only a single upload server 104 is illustrated in FIG. 1 for clarity, each can be implemented as multiple servers. Other servers may handle other aspects of the VID server 100 not discussed here. It will also be understood that the described uploading of content is not intended to be limited to content uploaded or downloaded via the Internet or the http protocol.

For propose of clarity, only one media host system 102, content owner system 101 and advertiser system 103 are shown, though in practice there will be any number of such systems, including even hundreds or millions of media host systems 102, content owner systems 101 and advertiser systems 103. The media host system 102, content owner system 101, and advertiser system 103 can access media host interface 106, the content owner interface 126 or the advertiser interface 107 respectively, using any type of computer system and/or any type of communications network. The computer system can be a laptop, desktop, cell phone, handheld device, thin or thick client device, or any other appropriate computing platform. The communications network may be a wireless network, a cellular network, a local area network or any other type of network by which digital information may be transmitted. A content owner 101 is an entity that owns or controls at least some of the rights to a particular work. The content owner 101 may be an individual, a group of individuals, or an entity such as a music or video production company or studio, artists' group, royalty collection agency, or the like.

The VID server 100 is configured to allow content owners 101 to provide reference content, specify policies for the reference content and monetize reference content, and is one example of a means for doing so. The VID server 100 requires content owners 101 to register with the VID server 100. According to an embodiment, the content owner 101 may provide a specified amount of funds to register with the VID server 100. The content owner 101 may provide the registration funds on a one-time or on a periodic (e.g. monthly, yearly) basis. In some embodiments, the content owner 101 may provide a specified amount of funds in exchange for services performed by the VID server 100.

The content owner interface 126 is configured to enable content owners 101 to provide reference content to the VID server 100 via the upload server 104, and is one example of a means for doing so. Reference content may include audio, video, a combination of audio and video, or still images. Content owner interface 126 in one embodiment includes user and application programming interfaces for bulk processes such as ftp for exchange of content files and policy information. According to an embodiment, reference content may be provided in any type of digital format. The content owner 101 may provide metadata associated with the reference content including: the title of the reference content, the international standard recording code (ISRC), the artist/director of the reference content, the recording label of the reference content, an episode title/number of the reference content, the season of the reference content, and actors in the reference content. In other embodiments, the content owner interface 126 further allows the content owner 101 to upload metadata associated with the reference content in a standardized format such as a site profile which specifies types of metadata associated with data fields in the uploaded reference content.

The content owner interface 126 is further configured to enable content owners 101 to provide policies in association with the uploaded reference content. The policies may specify media hosts allowed to provide digital content matching the reference content to viewers and a set of media hosts that are not allowed (i.e. blocked) from providing digital content matching the reference content. The policies may further specify a requirement for the media hosts to provide activity information for hosted content matching the reference content. The policies may further specify financial terms such as a fee for a media host 102 to provide content matching the reference content or a requirement for the media host to share revenue received from the monetization of hosted content matching the reference content. Terms for sharing revenue from the monetization of content may include a defined percentage of revenue received by the media host 102 and a defined percentage of revenue received by the content owner 101. The policies may specify terms of use of the reference content such as restrictions on providing the reference content to viewers based on the context of the viewers. The context of the viewer may be based, for example, on the geographical location of the viewer and/or age of the viewer.

Through the content owner interface 126, the upload server 104 receives reference content and policy information from content owners 101, and stores the received information in reference content database 130 and policy database 114, respectively. The upload server 104 communicates with the transcoder 108 to transcode the received reference content into a common file format before storing the transcoded reference content in the reference content database 130. In one embodiment, each item of reference content is assigned a unique identifier in the reference content database 130. The unique identifier is additionally stored along with the policy information and content owner 101 information in the policy database 114. The fingerprinting engine 116 generates digital fingerprints for each item of reference content and stores the digital fingerprints in the reference content fingerprint database 112 in association with unique identifiers for the items of reference content. In alternate embodiments, the content owner 101 transcodes the hosted content, generates fingerprints for the hosted content and uploads the hosted content fingerprints to the VID server 100 in association with metadata for the hosted content.

A media host 102 is an entity that provides digital content to the content viewers. A content viewer is a computer that receives media from the media host 102. Media hosts 102 can include media hosting websites, social networking websites and media publishers such as YouTube™. Media hosts 102 can also include other entities that provide and/or organize collections of media content such as libraries, museums, etc. In some instances, a media host 102 may also be a content owner 101.

The media host 102 provides the media content to content viewers though a media hosting server, which may be a web server or other type of server. In various embodiments, the content viewer may receive the hosted content via download of the file, by streaming, or by any other method of receiving media content over a communications network.

The VID server 100 is further configured to allow the media host 102 to identify hosted content that matches reference content, enter into policy agreements with content owners 101 and monetize hosted content. Hosted content may include audio, video, a combination of audio and video, or still images. In most embodiments, the VID server 100 requires media hosts 102 to register with the VID server 100. According to an embodiment, the media hosts 102 may be required provide a specified amount of funds to register with the VID server 100. The media hosts 102 may also be required to provide a specified amount of funds each time a service is provided by the VID server 100. The media host 102 may be required to provide a specified amount of funds each time the VID server processed hosted content or indicia of hosted content uploaded by the media host 102.

The media host interface 106 is configured to enable the media host 102 to upload hosted content to the VID server 100 via the upload server 104. According to an embodiment, the media host interface 106 may allow the media host to upload hosted content in bulk using processes for bulk transfer of information such as ftp. The media host 102 may provide metadata associated with the hosted content including: the title of the hosted content, the international standard recording code (ISRC), the artist/director of the hosted content, the recording label of the hosted content, an episode title/number of the hosted content, the season of the hosted content, and actors in the hosted content. Additionally the media host interface may allow the media host to upload metadata associated with the hosted content in a standardized format such as a site profile which specifies different types of metadata associated with items of hosted content.

The upload server 104 is further configured to store the hosted content in the hosted content database 140 in association with identifiers specifying the media host 102 who uploaded the content and unique identifiers for the hosted content. The upload server 104 communicates with the transcoder 108 to transcode the received hosted content into a common file format before storing the in the hosted content database 140 in associated with unique identifiers for the hosted content and the media host. The fingerprinting engine 116 functions to generate digital fingerprints for each uploaded item of hosted content. The digital fingerprints for the hosted content are stored in the hosted content fingerprint database 111 in association with the unique identifiers for the hosted content and the media hosts 102. Alternatively, the media host 102 transcodes the hosted content, generates fingerprints for the hosted content and uploads the hosted content fingerprints to the VID server 100 in association with metadata for the hosted content.

The media host interface 106 is further configured to enable the media host 102 to provide information regarding default policy agreements to the policy engine 118. Default policy agreements can allow the media host 102 to specify terms of policies the media host 102 agrees to by default. In one embodiment, the default policy agreements include: an agreement to provide activity information for hosted content; an agreement to provide hosted content under restrictions; an agreement to prohibit distribution of hosted content; and an agreement to share advertising revenue generated from displaying hosted content. The policy engine 118 stores the default policy agreements in the policy database 114.

The crawling engine 170 is configured to crawl the Internet in order to identify hosted content on media host 102 websites, and is one example of a means for doing so. In an alternate embodiment, the media host 102 is not required to register with the VID server 100 but instead identified responsive to the crawling engine 170 crawling the internet to identify hosted content at media host 102 websites. Based on the identification of hosted content by the crawling engine 170, the VID server 100 may provide the identified media hosts 102 a request for the media host 102 to register with the VID server 100. In some embodiments, the crawling engine 170 may be further configured to store and analyze the identified hosted content. In these embodiments, the crawling engine 170 transmits the identified hosted content to the transcoder 108 and/or the fingerprinting engine 116 to generate fingerprints for the identified hosted content. The fingerprinting engine 116 stores the fingerprints for the identified hosted content in association with a unique identifier for the hosted content and the media host 102 identified by the crawling engine 170.

The fingerprinting engine 116 is further configured to compare the hosted content fingerprints in the hosted content fingerprint database 111 with the reference content fingerprints in the reference content fingerprint database 112. Based on the comparison of a hosted content fingerprint and a reference content fingerprint, four different metrics are generated: a confidence metric specifying the confidence of a match between an item of hosted content and an item of reference content, a duration metric specifying a duration of the match between the item of hosted content and the item of reference content, a proportion metric specifying a proportion of a match between the item of hosted content and the item of reference content and an offset metric specifying a an offset between item of reference content and the item of hosted content. The match metrics generated for each pair-wise comparison of items of reference content and items of hosted content are stored in the content match database 128.

The policy engine 118 is configured to retrieve policy information from the policy database 114 and store policy agreements and default policy agreements in the policy database 114, and is one example of a means for doing so. The policy engine 118 further functions to compare policy agreements with policies. If one or more of the metrics is above a threshold, the policy engine 118 retrieves the policy associated with the item of reference content from the policy database 114. If the policy does not prohibit the media host 102 from entering a policy agreement with the content owner, the policy engine 118 compares the policy with the default policy agreements specified by the media host 102. If no default policy agreements are specified by the media host 102 or the default policy agreements specified by the media host 102 do not match the policy, the policy engine 118 transmits the policy to the media host interface 106. The media host interface 106 presents the policy to the media host 102. The media host 102 may agree to accept the terms stated in the policy in order to provide the hosted content to content viewers. The policy engine 118 stores the policy agreement received from the media host 102 in the policy database 114.

The activity engine 150 is configured to communicate with the media host interface 106 to receive activity information for items of hosted content associated with policy agreements and advertising contracts. In most embodiments, the media host 102 is required to provide activity information to the VID Server 100 such as the frequency at which the hosted content is viewed, user click through rates associated with the hosted content, number of user streams, and/or ratings associated with the hosted content. In some embodiments, the media host 102 may also be required to provide activity information regarding the viewers who view the media content such as demographic information, geographic information and information regarding other hosted content the viewers request from the media host. In a specific embodiment, the media host 102 anonymizes the activity information before providing the activity information to the VID Server 100. In another embodiment, the activity engine 150 anonymizes the received activity information. The media host 102 may provide activity information to the VID server 100 on a continual or periodic basis.

The activity engine 150 provides activity information to the content owner interface 126 and advertiser interface 107. The activity engine 150 further provides activity information to the advertising engine 160. The activity engine 150 stores the activity information in the activity database 151.

The advertiser interface 107 provides information associated with hosted and reference content to the advertisers 103. Using the advertiser interface 107, the advertiser 103 may view match metrics indicating the number of media hosts 102 hosting media content that match reference content and the quality, duration and proportion and offset of the matches. The advertiser interface 107 may also display activity information indicating the frequency at which hosted content that matches reference content is viewed and the popularity of the hosted content. Based on this information, the advertisers 103 can bid to display advertisements in association with hosted content that matches a specified item of reference content.

The advertising engine 160 receives advertiser bids associated with items of hosted content matching an item of reference content. An advertiser's bid specifies an amount of funds the advertiser 103 agrees to provide in exchange for the display of an advertisement in association with an item of hosted content matching an item of reference content. The advertising engine 160 further receives digital content containing the advertisements to be displayed, herein referred to as advertising content. In alternate embodiments, the advertising engine 160 receives indicia of the advertising content such as a link to the advertising content. The advertising engine 160 stores the advertiser bids and ad content in association with unique identifiers for the items of reference and/or hosted content in the advertising database 161. The advertising engine 160 communicates with the activity engine 150 to receive activity information indicating the number of times advertisements are displayed in association with hosted content matching reference content.

The advertising engine 160 calculates an amount of funds to be received from the advertiser 103 based on the received activity information. The advertising engine 160 further 160 communicates with the policy engine 118 to determine the revenue sharing policy specified in the policy agreement between the media host 102 hosting an item of hosted content matching an item of reference content and a content owner 101 having rights to the item of reference content. Based on the revenue sharing policy, the advertising engine 160 determines an amount of the funds received from the advertiser 103 to distribute to the content owner 101 and an amount of the funds received from the advertiser to distribute to the media host 102. In most embodiments, the advertising engine 160 further determines an amount of funds that are received by the entity that owns or administrates the VID server 100.

Figure 1B:
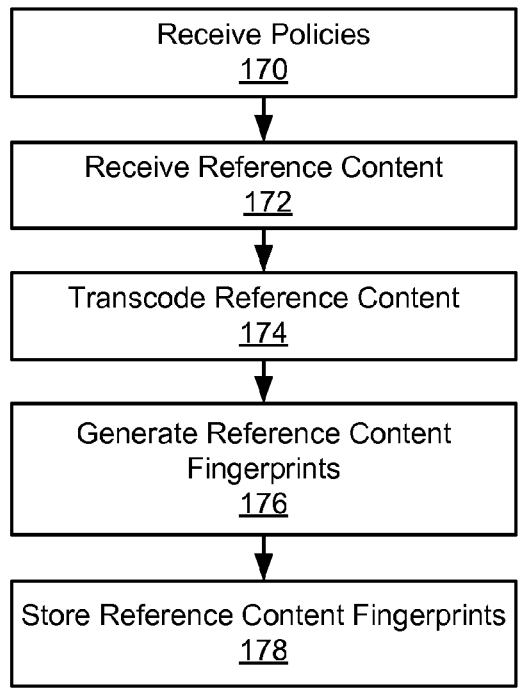
FIGS. 1b and 1c are flowcharts illustrating methods for generating fingerprints of media content in accordance with embodiments of the present invention.
Figure 1C:
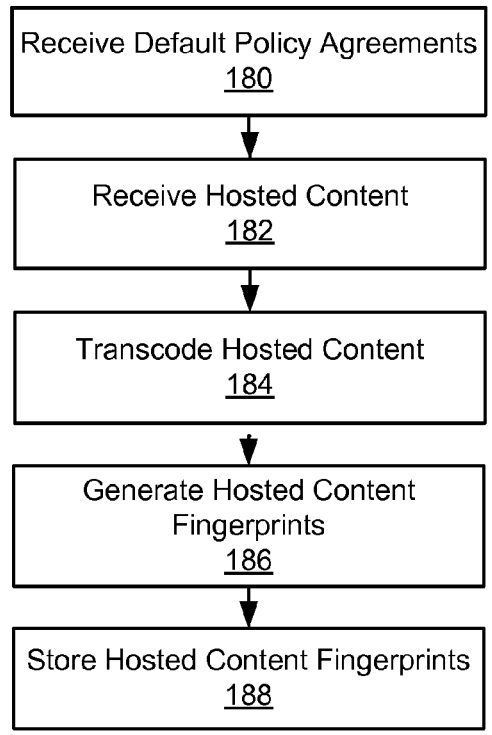

FIGS. 1b and 1c are flow charts illustrating steps performed by the VID server 100 to generate digital fingerprints for media content. Other embodiments perform the illustrated steps in different orders, and/or perform different or additional steps. Moreover, some of the steps can be performed by engines or modules other than the VID server 100. FIG. 1b illustrates the steps used for generating fingerprints for reference content received from content owners, while FIG. 1c illustrates the steps used for generating fingerprints for hosted content received from media hosts 102.

Referring to FIG. 1b, the upload server 104 receives 170 policies from the content owners 101. The upload server 104 receives 172 reference content from the content owners 101. Transcoder 108 converts 174 the reference content from one file type to another, in order to standardize content. This enables upload server 104 to accept reference content provided in various different formats while still being able to compare the reference content to the hosted content. In one embodiment, transcoder 108 converts 174 uploaded video content into the Adobe flash file type (.flv).

The fingerprinting engine 116 generates 176 digital fingerprints for the reference content. The fingerprinting engine 116 generates digital fingerprints for one or more channels corresponding to different media types associated with the reference content such as audio channel or a video channel. The fingerprinting engine 116 can generate 176 digital fingerprints using any type of algorithm or transform that encodes or captures information in the reference content such as values of features in the reference content. Suitable algorithms and transforms include: spectral encoding, cryptographic hash functions.

In one embodiment, the algorithm or transform used to encode information transforms the digital content into one or more digital fingerprints consisting of an alphanumeric string or "stream of information." In this embodiment, the generated alphanumeric string has a length/size that is proportional to the temporal length and/or spatial size of the media content. For instance, a two minute video would have a digital fingerprint half the length of a four minute video. In some embodiments, the media content is segmented into temporal or spatial sub-portions and fingerprints are generated for each of the temporal or spatial sub-portions. According to the media type, different sets of fingerprints can be generated for different aspects of the content. For instance, a set of fingerprints may be generated 176 for audio content associated with a video that is separate from a set of fingerprints generated for the video content.

The fingerprint engine 116 stores 178 the reference content fingerprints in the reference content fingerprint database 121.

Referring to FIG. 1c, the upload server 104 receives 180 default policy agreements from the media hosts 102. The upload server 104 receives 182 the hosted content from the media hosts 102.

Transcoder 108 converts 184 the hosted content from one file type to another, in order to standardize content. This enables upload server 104 to accept hosted content provided in various different formats while still being able to compare the hosted content to the reference content. In one embodiment, transcoder 108 converts 184 uploaded video content into the Adobe flash file type (.flv).

The fingerprint engine 116 generates 186 digital fingerprints for the hosted content as described above in regards to the reference content. The fingerprinting engine 116 generates digital fingerprints for one or more channels corresponding to different media types associated with the hosted content such as audio channel or a video channel. The fingerprint engine 116 stores 188 the hosted content fingerprints in the hosted content fingerprint database 111.

Figure 2:
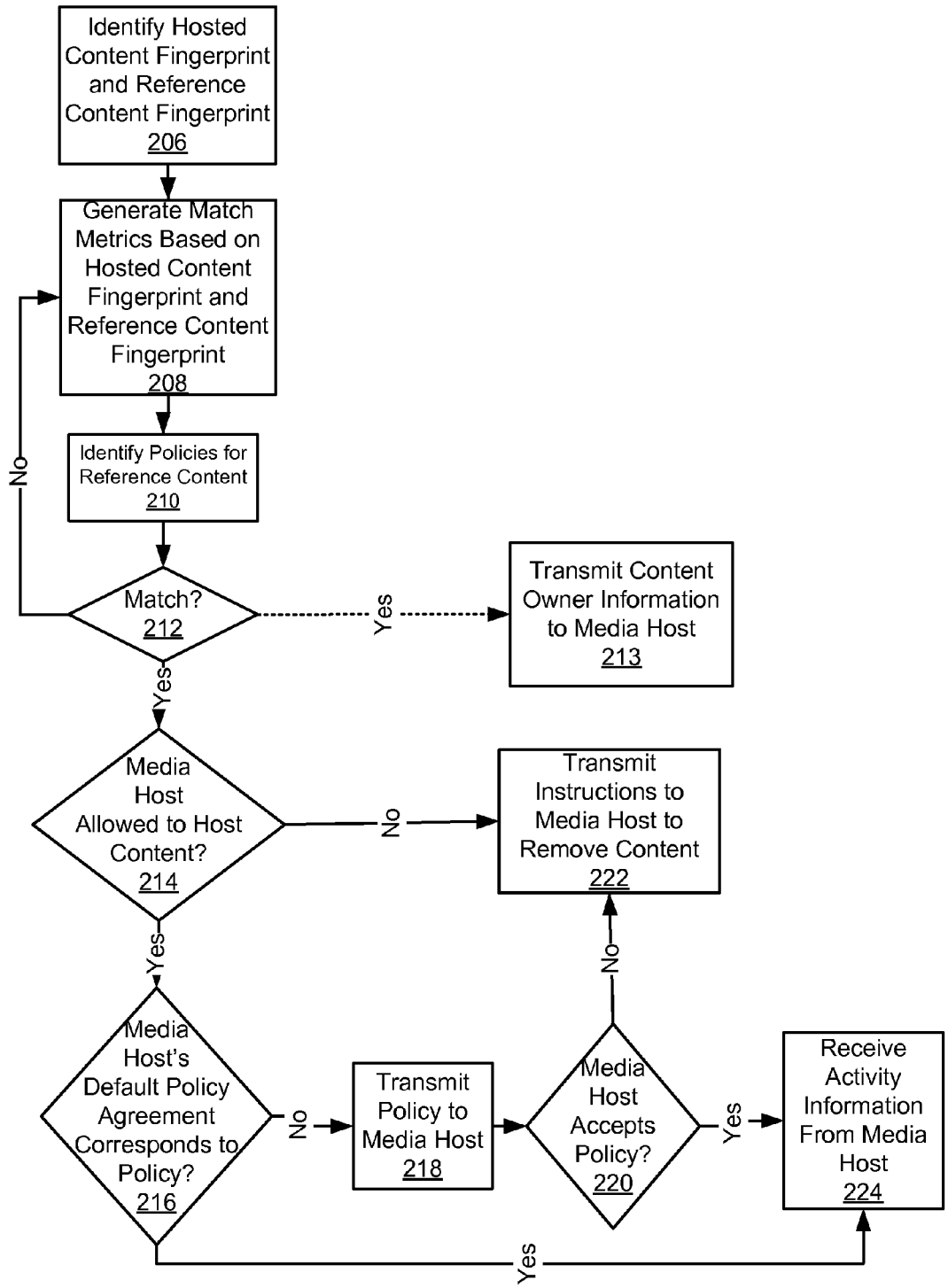
FIG. 2 is a flowchart illustrating a method for providing content rights management in accordance with an embodiment of the present invention.

FIG. 2 is a flow chart illustrating steps performed by the VID server 100. Other embodiments perform the illustrated steps in different orders, and/or perform different or additional steps. Moreover, some of the steps can be performed by engines or modules other than the VID server 100

The fingerprint engine 116 identifies a reference content fingerprint stored in the reference content fingerprint database 112 and a hosted content fingerprint stored in the hosted content fingerprint database 111 for analysis. In one embodiment, the fingerprint engine may identify the hosted content fingerprint and/or the reference content fingerprint whenever new hosted content fingerprints or reference content fingerprints are generated.

The fingerprinting engine 116 analyzes the reference content fingerprint and the hosted content fingerprint to generate 208 match metrics. The fingerprinting engine 116 generates 208 pair-wise match metrics based on reference content fingerprints associated with items of reference content and hosted content fingerprints associated with items of hosted content. In one embodiment, a match metric represents a measure of the degree of match between a reference content fingerprint (or portion thereof) and a hosted content fingerprint (or portion thereof); thus the match metric can be considered as a measure of similarity between these fingerprints. In one embodiment, the fingerprinting engine 116 compares one or more reference content fingerprints associated with items of reference content represented as alphanumeric strings with one or more reference content fingerprints associated with items of reference content represented as alphanumeric strings. In this embodiment, the fingerprinting engine 116 uses algorithms that identify portions of alphanumeric strings that in order to identify matches between the reference content fingerprint(s) and the hosted content fingerprint(s). Suitable algorithms for identifying matches between data represented in the alphanumeric strings include: string alignment algorithms, string matching algorithms, Hamming distance algorithms, Manhattan distance algorithms or Euclidean distance algorithms. Other algorithms for identifying a match between data represented in the alphanumeric strings may include probabilistic algorithms which indicate the likelihood that two alphanumeric strings are similar.

Based on the identified match between portions of the reference fingerprint(s) and the hosted content fingerprint(s), the fingerprinting engine 116 generates 208 four different match metrics: a duration metric, a proportion metric, an offset metric and a confidence metric. In most embodiments, the confidence value corresponds to a value which quantifies the identified match or likelihood of the identified match.

The duration metric is a value that indicates a quantity of space and/or time over which the item of reference content matches the hosted content. In one embodiment, the fingerprinting engine 116 generates the duration metric by determining the portion of time and/or space which corresponds to the portions of the reference content fingerprints and hosted content fingerprints with identified similarity. The proportion metric is a value that indicates the quantity of space or time over which the item of reference content matches the hosted content relative to the temporal and/or spatial size of the item of reference content or the item of hosted content. In one embodiment, the fingerprinting engine 116 generates the proportion metrics by determining a ratio of the value indicated by the duration metric over a value indicating the length and/or size of the item of reference content or the item of hosted content. The offset metric indicates a portion of time by which the item of hosted content differs from the item of reference content. The fingerprinting engine 116 generates the offset metric by determining the temporal portion of time and/or space which corresponds to the portions of the reference content fingerprints and hosted content fingerprints that do not match. In a specific embodiment, the offset metric may represent the portion of time at the beginning of the hosted content that does not match the reference content.

The policy engine 118 identifies 210 a policy specified for the reference content associated with the match metrics. In alternate embodiments, there may be a policy specified for an item of reference content may not be identified (i.e. the content owner 101 is not required to specify a policy when uploading the item of reference content). The fingerprinting engine 116 determines whether there is a match 212 between an item of reference content and an item of hosted content based on one or more of the match metrics for a match exceeding a defined threshold value for the match metric. In one embodiment, the defined threshold values for the match metrics may be defined by the content owner 101 in the policy for the item of reference content. For example, a content owner 101 may specify a duration threshold value of 1 minute is required for a match between items of hosted content and items of reference content owned by the content owner 101. Likewise, a content owner may specify a confidence threshold value of 80% is required for a match between items of reference content and items of hosted content. Standard threshold values for each of the match metrics can be defined by an administrator of the VID server 100, and used where the content owner has not defined their own values. The match metrics are stored in the content match database 128.

If the fingerprinting engine 116 determines that the item of reference content and the item of hosted content do not match, the fingerprinting engine 116 continues to generate 208 match metrics for other items of reference content and items of hosted content. If the fingerprinting engine 116 determines that the item of reference content and the item of hosted content match, the policy engine 118 determines 214 whether the media host 102 hosting the item of hosted content is prohibited from providing items of hosted content matching the item of reference content based on the policy specified for the item of hosted content matching the item of reference content. In embodiments where there is no policy is specified for an item of reference content, the policy engine 118 transmits 213 contact information for the content owner 101 associated with the item of reference content to the media host 102 hosting the item of hosted content along with information regarding the match.

If the media host 102 is prohibited from hosting content matching the reference content, the VID server 100 transmits 222 instructions to media host 102 to remove or destroy the hosted content matching the reference content. If the media host 102 is not prohibited from hosting content matching the reference content, the policy engine 118 determines 216 whether default policy agreements specified by the media host 102 correspond to the terms of the policy. For example, the policy engine 118 may determine that the default policy agreements include an agreement to provide activity information which matches a policy specified by the content owner 101 requiring provision of activity information.

If the default policy agreements specified by the media host 102 correspond to the terms of the policy, then the media host 102 provides 224 activity information regarding the item of reference content to the VID server 100. If the default policy agreements specified by the media host 102 do not correspond to the terms of the policy or the media host has not specified default policy agreements, then the VID server 100 transmits 218 the policy to the media host 102 via the media host interface 106. The VID server 100 receives instructions from the media host 102 which indicate whether 220 the media host 102 accepts or declines the terms stated in the policy.

If the media host 102 accepts terms stated in the policy, then the media host 102 provides 224 activity information regarding the item of reference content to the VID server 100 and indicia of the media host's 102 acceptance is stored in the policy database 114. Indicia of the media host's 102 acceptance may be include, for example, an electronic signature or a message.

Figure 3:
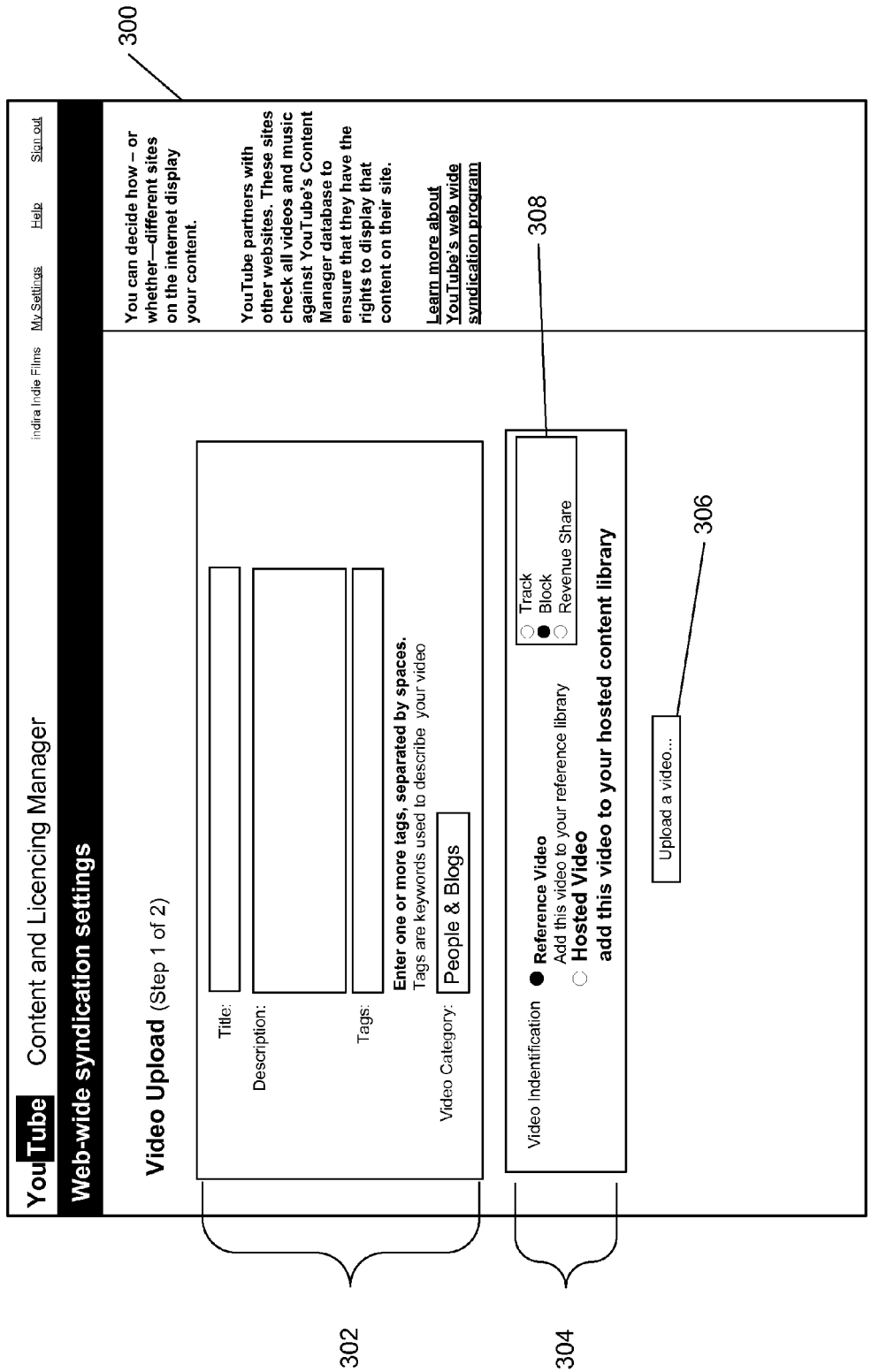
FIG. 3 illustrates a user interface for providing reference content to the VID Server in accordance with an embodiment of the present invention.

FIG. 3 illustrates an example of a user interface 300 provided by the content owner interface 126 that enables a content owner 101 to upload reference content to the reference content database 130. The illustrated user interface 300 may also be provided by the media host interface 106 that enables a media host 102 to upload hosted content to the hosted content database 140.

In the illustrated example, one region 302 provides inputs for the content provider 101 and the media host 102 to specify metadata associated with the reference content and the hosted content. The inputs illustrated include inputs for metadata including the title, description and tags associated with the reference and hosted content.

In region 304, the content owner 101 and/or media host 102 selects whether the content to be uploaded is reference content or hosted content. Region 304 further includes a control object the content owner 101 specifies policy information 308. In the embodiment illustrated, the policy information 308 includes whether a media host 102 hosting content matching the uploaded reference content is required to provide the content owner with activity information (labeled "track"), whether the media hosts 102 hosting content matching the uploaded reference content are prohibited from providing the hosted content to viewers (labeled "block"), and whether media hosts 102 hosting hosted content matching the uploaded reference content are required to share revenue generated from monetizing the hosted content with the content owner 101 (labeled revenue share).

In region 304, the media host further specifies default policy agreement information 308 associated with the reference content. In the embodiment illustrated, the default policy agreement information 308 corresponds to the policy information 308 specified by the content owner 101. In the embodiment illustrated, the default policy agreements 308 includes whether the media host 102 agrees to provide the content owner with activity information (labeled "track") associated with the hosted content matching reference content, whether the media hosts 102 agrees not to provide hosted content matching reference content to viewers (labeled "block"), and whether media hosts 102 agrees to share revenue generated from monetizing hosted content matching reference content with content owners 101 (labeled "revenue share").

Finally, a location, e.g., on the content owner's server, is specified in box 306, and the reference content and hosted content is then uploaded to system 100.

FIG. 4 illustrates an example of a user interface page 400 according to an alternate embodiment of the content owner interface 125. In this embodiment the content owner 101 uploads their reference content to the VID Server 100, then uses the user interface page 400 to specify media hosts 102 allowed to provide reference content owned by the content owner 101. In the illustrated example, one section 410 allows the content owner to specify that their content can be provided by either: a specific media host 102, only a subset of media hosts 102 partnered with the VID server 100, or all media hosts 102 partnered with the VID server 100.

Once a selection has been made from in region 410, a media host display section 420 displays a set media hosts 421, 422, 423, 424, 425 to the content owner 101 for further selection. In one embodiment, a content owner may select a media host by specifying a media host by its associated uniform resource locator (URL) rather than selecting the media host from the media host display section 420. In the example illustrated, information associated with a media hosts 424 may be displayed including: the number of international sites 426 associated with the media host 424, the total number of views 434 the media host 424 receives, the number of views 428 the media host 424 receives over a specific time period, default policy agreements 427 accepted by the media host 424, policies 438 selected by the content owner 101 and the number of items 432 of hosted content for which the media host 424 has policy agreements. In the example illustrated, the policies 427 specify whether the media host 102 is required to provide activity information for hosted content or share revenue from monetizing the hosted content such as through displaying advertisements with the hosted content.

The user interface page 400 further includes a blocked media hosts section 450 which allows the content owner 101 to specify a set of media hosts 102 who are prohibited from providing hosted content to users if the hosted content matches reference content uploaded by the content owner 101 to the VID server 100.

Figure 5:
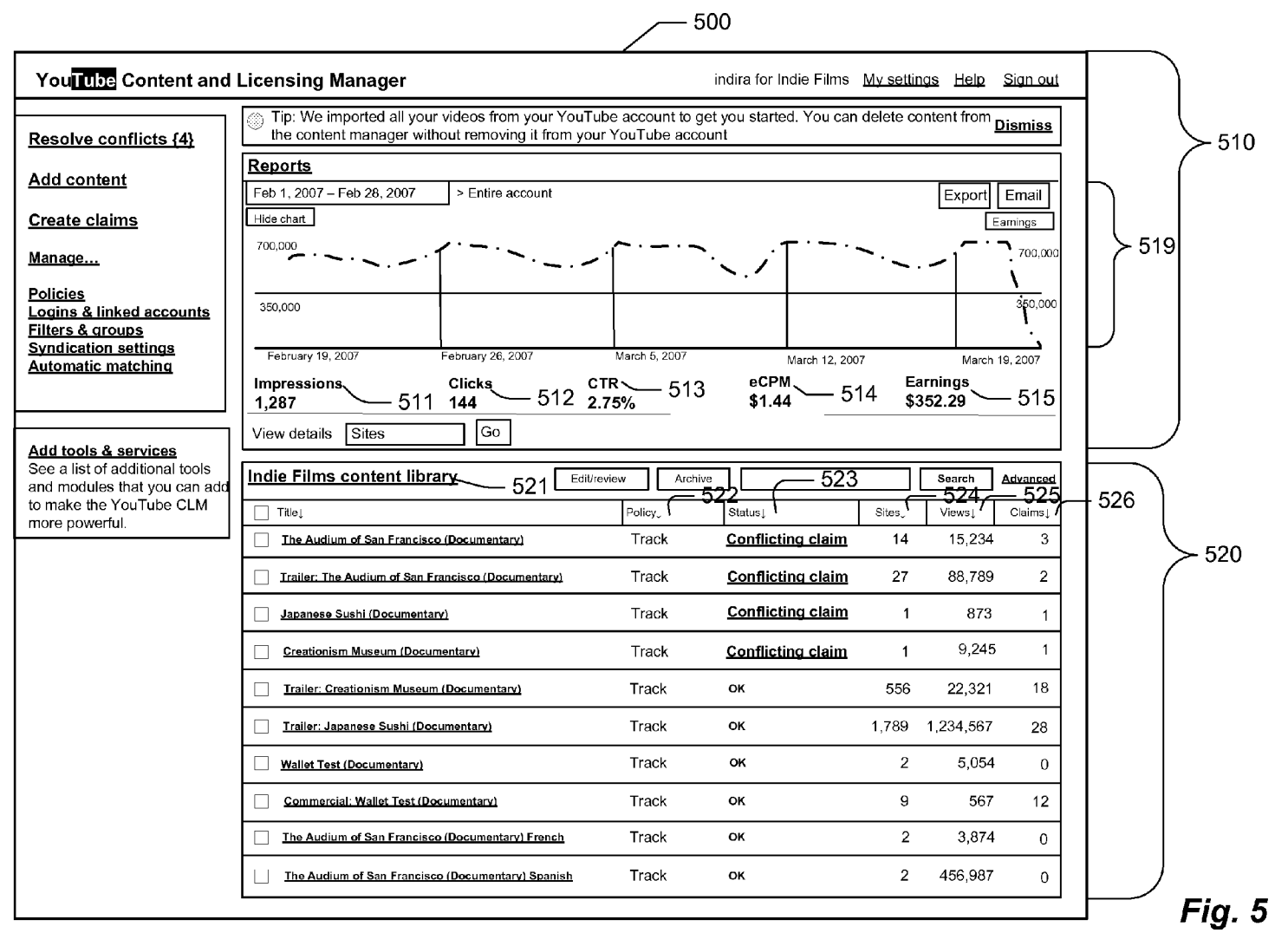

FIG. 5 illustrates an example of a user interface page 500 which allows a content owner 101 to view activity information associated with reference content. In other embodiments, similar user interface pages 500 may be provided to an advertiser 103 and/or media host 102 to view activity information associated with reference content. In a content library section 520, information associated with a set of items of reference content is displayed. In the example illustrated, the information includes the titles of the items of reference content 521, policy information 522 associated with the items of reference content, status information 523 specifying whether or not another content owner 101 has provided the same item of reference content creating a conflict (indicated in the example as "conflicting claim"), the number of media hosts 524 providing hosted content matching the reference content, the number of views 525 of the hosted content matching the reference content, and the number 526 of items of hosted content that match the item of reference content.

According to the embodiment, policy specification for items of reference content that have been submitted by multiple content owners 101 resulting in conflicting claims may be handled in different ways. In one embodiment, the policy engine 118 places conflicting claims associated with items of reference content into a conflict queue. The conflicting claims are processed by the content owners 101 to determine which content owner 101 has rights to the item of reference content. In this embodiment, the content owner 101 who has rights to the item of reference content will specify policies associated with the item of reference content. In another embodiment, the content owner 101 with the majority of rights for the item of reference content will specify policies associated with the item of reference content.

In another embodiment, if there is a conflicting claim, the multiple content owners 101 may jointly specify policies associated with the item of reference content. In this embodiment, the policy engine 118 determines whether policies specified by multiple content owners 101 differ. If the policies differ, the policy engine 118 may arbitrate policy conflicts by presenting the specified policies to the multiple content owners 101. If the specified policies associated with the item of reference content include monetization of the reference content, revenue from the monetization of the reference content will be split between the multiple content owners 101.

The user interface page 500 also includes a reports section 510 which displays activity information and advertising information associated with reference content. In the example illustrated, the reports section 510 displays activity information and revenue information associated with all of the content owner's 101 items of reference content. In other embodiments, the reports section 510 is used to display activity information and revenue information associated with a single item of reference content. The reports section 510 displays a chart 519 showing the funds earned through monetization of the items of reference content. The reports section 510 also displays the total number of impressions 511 for ad content displayed in association reference content (i.e. number of times the ad content is displayed to a viewer). The reports section 510 also displays an average number of clicks 512 the ad content displayed in association with reference content receives and the average click through rate (CTR) 513 associated with the displayed ad content. The reports section 510 further displays the average estimated "cost per mille" (eCPM) 514 associated with the ad content displayed in association with the reference content, the ePCM specifies the average amount of funds required for one thousand impressions associated with an item of ad content (i.e. displaying an advertisement in association with the reference content one thousand times). The reports section further displays the average funds 515 earned by displaying ad content in association with the items of reference content.

In alternate embodiments, one or more controls may be displayed which allow advertisers to bid to display advertising content in association with the items of reference content. The controls may allow the advertiser to specify an amount of funds they are willing to provide to display an advertisement in associated with hosted content associated with the reference content. According to an embodiment, the advertiser may select to display an advertisement in associated with all items of hosted content matching an item of reference content or a specific item of hosted content matching an item of reference content. For instance, an advertiser may select to display an advertisement only with a specific video which uses a song as background music instead of all videos which use the song as background music.

Figure 6:
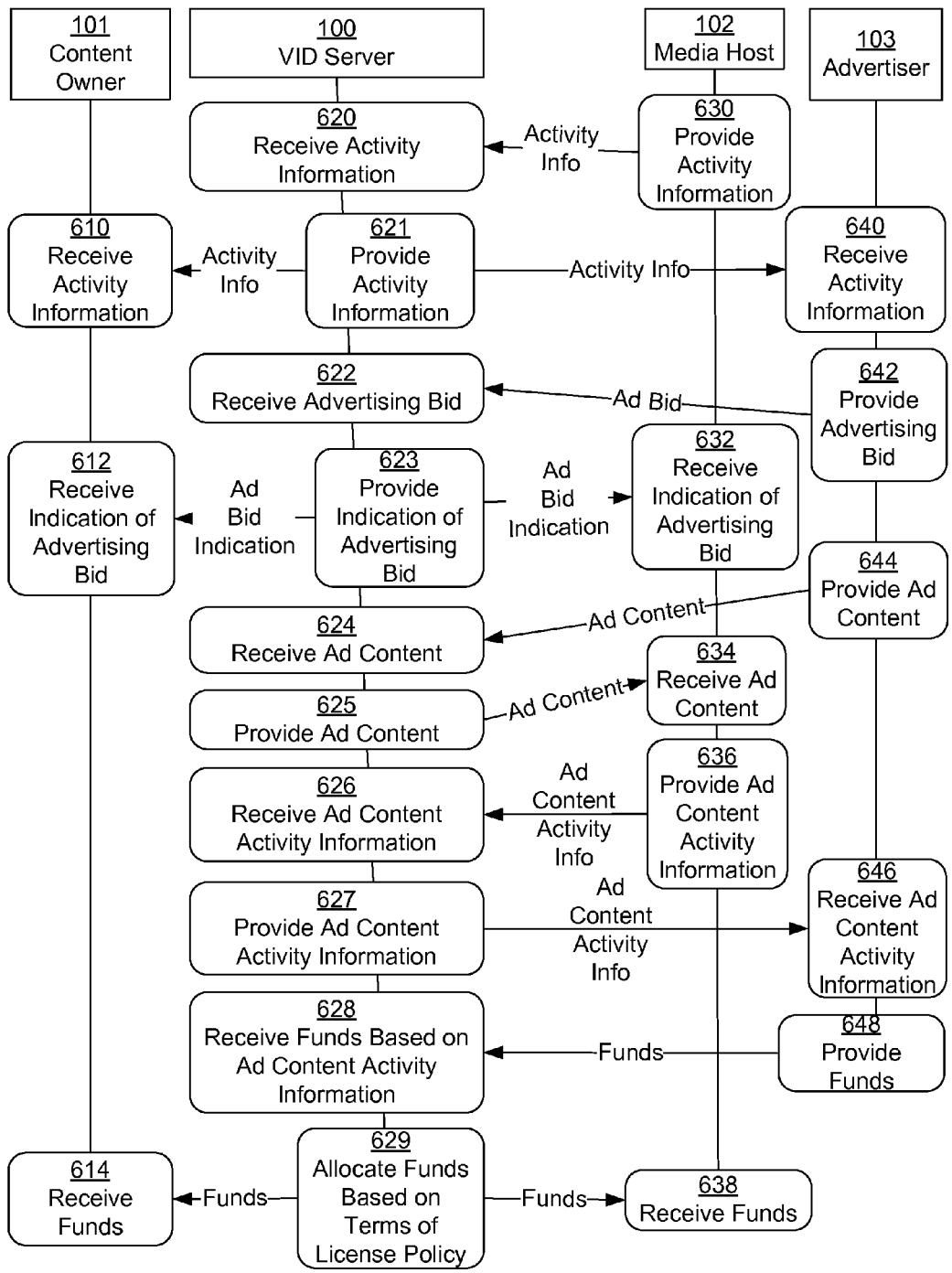
FIG. 6 is a process flow diagram illustrating operations performed by a content owner, the VID server, a media host and an advertiser to monetize content.

FIG. 6 is a process flow diagram illustrating operations performed by a content owner 101, the VID server 100, a media host 102 and an advertiser 103 to monetize content. The operations may be performed in any order, synchronously or asynchronously. Some of the operations may be performed once; other steps may be performed on a continuous or periodic basis. In other embodiments the content owner 101, the VID server 100, the media host 102 and the advertiser 103 may perform different or additional steps. Moreover, some of the steps performed by other entities.

The content owner 101 receives 610 from the VID server 100 activity information for hosted content that matches reference content owned by the content owner 101. The activity information is provided 630 by media hosts 102 who have agreed (e.g., through default policy agreements or acceptance of the policy) to a policy that specifies terms for sharing revenue from monetization of hosted content between the content owner 101 and the media host 102. The content owner 101 receives 612 an indication that an advertising bid has been submitted by an advertiser, the advertising bid specifying an advertiser's 103 agreement to display ad content in association with hosted content matching the item of reference content. The content owner 101 also receives 614 funds based on the number of displays of the ad content in association with the hosted content and the terms for sharing revenue specified in the policy.

The media host 102 provides 630 to the VID server 100 activity information for reference content including: number of views, click through rates, number of streams, demographic information associated with viewers, etc. The media host receives 632 an indication that an advertising bid has been submitted by an advertiser 103 from the VID server 100, the advertising bid specifying an advertiser's 103 agreement to display ad content in association with hosted content matching the item of reference content. The media host 102 receives 634 ad content corresponding to an advertising bid associated with the item of reference content from the VID server 100. The media host 102 continues to provide 636 activity information for the item of hosted content to the VID server 100 including activity information specific to the ad content such as the number times the media host 102 displays the ad content in association with the item of hosted content and click through rates for the displayed ad content. Furthermore, the media host 102 may provide activity information specific to the ad content such as the number of streams associated with the ad content. The media host 102 receives 638 an amount of funds based on the number of displays of the ad content, the number of click throughs of the ad content, and/or the number of streams of the ad content that is in association with the hosted content and the revenue sharing terms specified in the policy. In one embodiment, a stream of an ad content is based on a threshold amount of time that the ad content is viewed by a user on the media host 102. In most embodiments, the media host 102 is either periodically credited with an amount of funds by the VID Server 100 (as shown) or periodically receives funds electronically from the advertiser 103 (not shown) or the VID server 100.

The advertiser 103 receives 640 activity information about an item of reference content including: the number of views of hosted content matching the reference content, metadata associated with the reference content such as the title of the reference content or an artist associated with the reference content, the number of matches between the hosted content and the reference content. Based on the information, the advertiser 103 provides 642 an advertising bid, the advertising bid representing an agreement to provide funds based on the displayed ad content in association with one or more items of hosted content matching the reference content. In some embodiments, the advertiser may elect to provide 642 an advertising bid specific to a media host 102. In other embodiments, the advertiser may elect to provide 642 an advertising bid for all media hosts 102. The advertiser 103 provides 644 ad content to the VID server 100, the ad content to be displayed in association with hosted content matching the reference content. The advertiser 103 receives 646 activity information specific to the ad content including the number of times the ad content is displayed in association with hosted content matching the reference content. The advertiser 103 provides 648 funds based on the number of displays of the ad content in association with hosted content matching the reference content. In most cases, the advertiser 103 is either periodically debited the amount of the funds by the VID server 100 or the advertiser 103 periodically electronically transmits the funds to the VID Server 100.

The VID server 100 receives 620 activity information for an item of hosted content from a media host 102, the hosted content matching an item of reference content and the media host 102 having provided an agreement to a policy for the reference content provided by the content owner 101. The VID server 100 provides 621 the activity information for the hosted content matching the reference content to the content owner 101 and the advertiser 130. The VID server 100 receives 622 an advertising bid from the advertiser 103, the advertising bid indicating an agreement to provide funds based on the display of ad content in association with hosted content matching the item of reference content. The VID server 100 provides 623 an indication of the advertising bid to the content owner 101 and the media host 102. The VID server 100 receives 624 ad content to be displayed in association with the hosted content matching the item of reference content. The VID server 100 provides 625 the ad content to the media host 102. The VID server 100 receives 626 activity information specific to the ad content from the media hosts 102, the activity information including the number of times the ad content is displayed by the one or more media hosts 102. The VID server 100 provides 627 the activity information specific to the ad content to the advertiser 103. The VID server 100 receives 628 funds from the advertiser 103 based on the activity information specific to the ad content, specifically the number of times the ad content is displayed in association with hosted content matching the reference content. The VID server 100 allocates 629 funds received from the advertiser between the media hosts 102, the content owner 101 and the entity that administrated or operates the VID server 100 according to the terms specified in the policy agreement between the media host 102 and the content owner 101. The VID 100 server allocates 629 funds to each media host proportional to the number of times the media host 102 displayed the content. The VID server 100 identifies the revenue sharing terms specified in policy agreement between each of the media hosts 102 and the content owner 101 who owns the reference content According to the terms specified in the policy, the funds can be allocated 629 between the media host 102, the content owner 101 and the VID server 100 in any appropriate way such as sharing by percentage split, by a flat payment, and so on, as specified by the content owner 101 in the policy agreement. In some embodiments, a default percentage split is used to allocate funds if the content owner 101 does not provide a percentage split in the policy. Where multiple content owners exist, they may share together in the negotiated revenue. This is particularly so, for example, in the case of music due to the highly fragmented rights holder landscape.

The present invention has been described in particular detail with respect to a limited number of embodiments.

Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. For example, the particular functions of fingerprinting engine 116, policy engine 118, and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method for providing management of digital content, the method executed by one or more computer systems and comprising:

storing in the computer system a plurality of items of reference content;

storing in the computer system a plurality of policies, each policy associated with an item of reference content and describing terms of use for hosted content corresponding to the item of reference content;

receiving in the computer system an item of hosted content from a media host, the media host separate from the computer system and the media host storing items of hosted content that are provided to a plurality of users;

receiving a default policy agreement from the media host, the default policy agreement specifying terms of policies that the media host agrees to by default;

generating, by the computer system, a digital fingerprint for the item of hosted content;

comparing the digital fingerprint for the item of hosted content with a digital fingerprint of a stored item of reference content, the stored item of reference content provided by a content owner having rights to the stored item of reference content;

generating by the computer system a match metric representing a duration of a match between the item of hosted content and a stored item of reference content based on the comparison of the digital fingerprint for the item of hosted content with the digital fingerprint for the stored item of reference content;

identifying by the computer system a stored policy associated with the item of reference content responsive to the match metric exceeding a threshold, the stored policy including terms of use for the item of hosted content;

comparing the default policy agreement from the media host and the stored policy associated with the item of reference content, the comparison indicating whether the terms of policies that the media host agrees to by default matches the terms of use for the item of hosted content;

providing by the computer system the policy to the media host responsive to the default policy agreement not matching the policy associated with the item of reference content;

responsive to receiving, from the media host, an agreement to the terms of use for the item of hosted content specified in the policy provided to the media host, receiving, from the media host, activity information regarding the item of hosted content that occurred on the media host.

2. The method of claim 1, wherein identifying the stored policy associated with the item of reference content comprises:
determining that the match metric that represents the duration of the match between the item of hosted content and the item of reference content exceeds the threshold.

3. The method of claim 1, wherein the match metric further represents a confidence of the match between the item of hosted content and the item of reference content.

4. The method of claim 3, wherein identifying the stored policy associated with the item of reference content comprises:
determining that the match metric that represents the confidence of the match between the item of hosted content and the item of reference content exceeds the threshold.

5. The method of claim 1, wherein the match metric further represents an offset of the correspondence between the item of hosted content and the item of reference content.

6. The method of claim 5, wherein identifying the stored policy associated with the item of reference content comprises:
determining that the match metric that represents the offset of the correspondence between the item of hosted content and the item of reference content exceeds the threshold.

7. The method of claim 1, further comprising:
receiving the reference content from a content owner;
generating the digital fingerprint of the reference content; and
storing the digital fingerprint of the reference content.

8. The method of claim 1, wherein the media host is a publisher.

9. The method of claim 1, wherein the media host is a library.

10. The method of claim 1, wherein the item of hosted content is received from a hosting site on which the hosted content is hosted for viewing.

11. The method of claim 1, wherein the item of hosted content includes audio content.

12. The method of claim 1, wherein the item of hosted content includes video content.

13. The method of claim 1, wherein the item of hosted content includes audio and video content.

14. The method of claim 1, wherein the item of hosted content includes a still image.

15. The method of claim 1, wherein the item of hosted content is user-generated content.

16. The method of claim 1, wherein the item of hosted content is legacy content.

17. The method of claim 1, wherein the item of hosted content is library content.

18. The method of claim 1, further comprising receiving the policy from the content owner.

19. The method of claim 1, wherein the activity information includes a number of times the media host provides the item of hosted content to viewers.

20. The method of claim 1, wherein the activity information includes demographic information associated with the viewers.

21. The method of claim 1, wherein the activity information includes information indicating other hosted content the media host provides to the viewers.

22. The method of claim 1, wherein the specified set of restrictions includes at least a first restriction based on one of: geographic location of viewers and age of viewers.

23. The method of claim 1, wherein the stored policy specifies that the media host is required to share funds generated from providing the hosted content to viewers with the content owner.

24. The method of claim 23, wherein the stored policy specifies a percentage of funds generated from providing the item of hosted content that the media host is required to provide to the content owner.

25. The method of claim 1, wherein the stored policy specifies that the media host is required to provide the hosted content to the viewers under a specified set of restrictions and identifying the stored policy comprises:
identifying that the media host agrees to provide the item of hosted content to the viewers under the specified set of restrictions.

26. The method of claim 1, wherein the stored policy specifies that the media host is required to provide activity information associated with the item of hosted content and identifying the stored policy agreement comprises:
identifying that the media host agrees to provide the activity information associated with the item of hosted content.

27. The method of claim 1, wherein the stored policy specifies that media host is prohibited from providing the item of hosted content to viewers under a specified set of restrictions and identifying the stored policy agreement comprises:
identifying that the media host agrees to stop providing the hosted content to viewers.

28. The method of claim 1, wherein generating the match metric that represents the duration of the match between the item of hosted content and the item of reference content comprises:
generating the match metric based on a ratio of the duration of the match and a duration of the item of reference content.

29. The method of claim 1, wherein the computer system is operated by a first entity and the media host is operated by a second entity.

30. The method of claim 29, wherein the first entity receives payment from the second entity responsive to providing the stored policy to the media host.

31. A method for providing management of digital content, the method comprising:
storing in a server a plurality of items of reference content;
storing in the server a plurality of policies, each policy associated with an item of reference content and describing terms of use for hosted content corresponding to the item of reference content;
receiving, at the server, an item of hosted content from a media host, the media host separate from the computer system and the media host storing items of hosted content that are provided to a plurality of users;
receiving a default policy agreement from the media host, the default policy agreement specifying terms of policies that the media host agrees to by default;
generating, by the server, a digital fingerprint for the item of hosted content;
comparing the digital fingerprint for the item of hosted content with a digital fingerprint of a stored item of reference content, the stored item of reference content provided by a content owner having rights to the stored item of reference content;

generating, at the server, a value that represents a duration of a match between the item of hosted content and a stored item of reference content based on the comparison of the digital fingerprint for the item of hosted content with the digital fingerprint for the stored item of reference content;

identifying a stored policy associated with the stored item of reference content responsive to the value that represents the duration of the match exceeding a threshold, the policy including terms of use for the hosted content; and comparing the default policy agreement from the media host and the stored policy associated with the stored item of reference content, the comparison indicating whether the terms of policies that the media host agrees to by default matches the terms of use for the stored item of hosted content;

providing the stored policy to the media host responsive to the default policy agreement not matching the stored policy associated with the stored item of reference content; and responsive to receiving, from the media host, an agreement to the terms of use for the item of hosted content specified in the policy provided to the media host, receiving, from the media host, activity information regarding the item of hosted content that occurred on the media host.

32. A computer program product comprising a non-transitory computer-readable storage medium storing executable code for providing management of digital content, the code when executed by one or more computer processors of a computer system causes the one or more computer processors to perform steps comprising:

storing in the computer system a plurality of items of reference content;

storing in the computer system a plurality of policies, each policy associated with an item of reference content and describing terms of use for hosted content corresponding to the item of reference content;

receiving in the computer system an item of hosted content from a media host, the media host separate from the computer system and the media host storing items of hosted content that are provided to a plurality of users;

receiving a default policy agreement from the media host, the default policy agreement specifying terms of policies that the media host agrees to by default;

generating, by the computer system, a digital fingerprint for the item of hosted content;

comparing the digital fingerprint for the item of hosted content with a digital fingerprint of a stored item of reference content, the stored item of reference content provided by a content owner having rights to the stored item of reference content;

generating by the computer system a match metric representing a duration of a match between the item of hosted content and a stored item of reference content based on the comparison of the digital fingerprint for the item of hosted content with the digital fingerprint for the stored item of reference content;

identifying by the computer system a stored policy associated with the item of reference content responsive to the match metric exceeding a threshold, the stored policy including terms of use for the item of hosted content;

comparing the default policy agreement from the media host and the stored policy associated with the item of reference content, the comparison indicating whether the terms of policies that the media host agrees to by default matches the terms of use for the item of hosted content;

providing by the computer system the policy to the media host responsive to the default policy agreement not matching the policy associated with the item of reference content;

responsive to receiving, from the media host, an agreement to the terms of use for the item of hosted content specified in the policy provided to the media host, receiving, from the media host, activity information regarding the item of hosted content that occurred on the media host.

* * * * *